Feb. 28, 1933. E. H. ALDEBORGH 1,899,253
SNAP GAUGE
Filed April 17, 1931
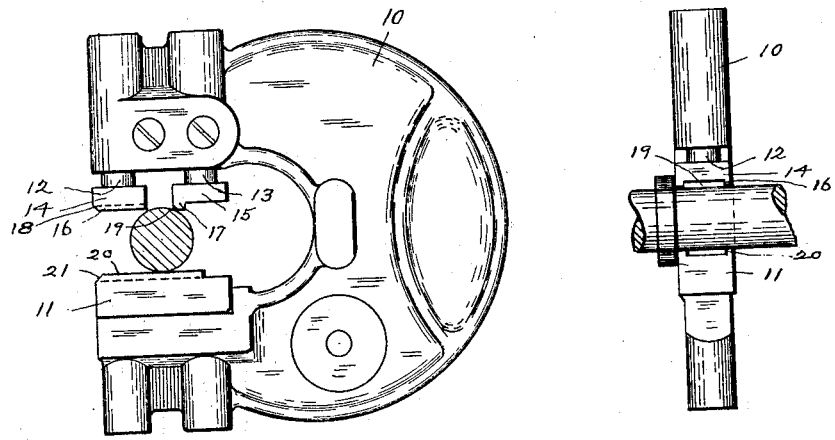
Fig 1    Fig 2
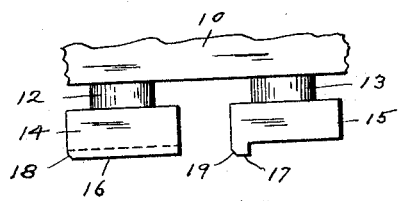
Fig 3    Fig 5
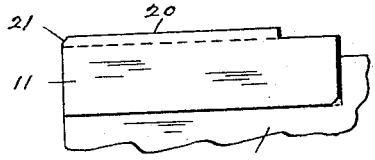
Fig 4    Fig 6
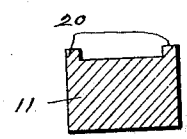 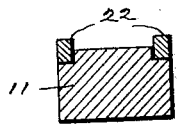
Fig 7    Fig 8
Inventor
Erik H. Aldeborgh
By John J. Thompson
Attorney Patented Feb. 28, 1933

1,899,253

UNITED STATES PATENT OFFICE

ERIK H. ALDEBORGH, OF POUGHKEEPSIE, NEW YORK, ASSIGNOR TO STANDARD GAGE COMPANY, INC., OF POUGHKEEPSIE, NEW YORK, A CORPORATION OF NEW YORK

SNAP GAUGE

Application filed April 17, 1931. Serial No. 530,754.

This invention relates to a gauge and more particularly to that kind which is known as a snap gauge employed for the checking of external dimensions in the production of parts.

While it is now the common practice in snap gauges to make the anvils and gauging pins with large flat ground and lapped surfaces, which go to make a gauge of rugged construction, these large contact surfaces are undesirable for very close or accurate measurements as they produce friction when brought into contact with the "work" and do not provide the most sensitive "feel".

The object of the invention is to provide a snap gauge in which the contact surfaces of both the anvil and the pins is very much reduced in size without detracting from the rugged construction and width of jaw of the gauge.

Another object of the invention is to facilitate the manufacture of the gauge by reducing the surface of the contacts required to be ground and lapped, and also if desired these contact surfaces may be construced of a harder material than that of the body of the anvil and pins.

In the drawing—

Fig. 1 is a side elevation of a snap gauge embodying my invention, and also shows a piece of "work" being gauged.

Fig. 2 is an edge view of the same, illustrating how a shoulder piece may be gauged close up to the shoulder.

Fig. 3 shows an enlarged detail view of the gauging pins.

Fig. 4 shows an enlarged detail view of the side of the anvil.

Fig. 5 shows a plan view of the contact gauging surface of the pins.

Fig. 6 shows a plan view of the contact gauging surface of the anvil.

Fig. 7 is a cross sectional view of the anvil showing the contact pieces integral with the body thereof.

Fig. 8 is a similar view, but showing the contact pieces of a different material and attached to the body portion.

Referring to the drawing—

The usual type of "C-frame" snap gauge 10 is shown, having the anvil 11 and the "go" and "no go" pins 12 and 13 with suitable adjusting and locking means.

The heads 14 and 15 of the pins 12 and 13 are square or rectangular in place of being round as in the usual style, and the outer, or "go" head 14 is formed with two parallel contact surfaces or ridges 16, which are formed adjacent the outer edges thereof and which are slightly raised above the surface of the head 14; while the "no go" head 15 is provided with a similar raised piece or contact surface 17 formed on its forward edge, and at right angles to the raised contacts 16 on the head 14. Both the forward ends of the contacts 16 and the forward edge of the contact 17 are slightly beveled to facilitate the entering of the "work", these beveled edges being indicated as at 18 and 19.

The anvil 11 is also formed with two parallel gauging contact strips 20 slightly raised above the surface of the body of the anvil, and placed adjacent to the sides or edges thereof, and also beveled upon their outer ends as at 21.

In the construction shown in Fig. 8, which will also apply to the heads of the contact pins, the contact pieces 22 may be of a different material from that of the body of either the anvil or the pins, and may be attached thereto in any suitable manner, such as welding or brazing.

It will thus be seen that the narrow contact surfaces while being spaced apart have all the advantage of the usual wide type of anvil and pins, but will present a narrow contact surface reducing the frictional contact with the "work" to a minimum, and also rendering the gauge more easily ground and lapped, and providing a more sensitive "feel".

Having thus described my invention, what I claim as new and desire to secure by Letters Patent, is:—

In a gauge of the class described, gauging members comprising an anvil member and two gauging members, raised parallel contact strips formed on said anvil member, raised contact strips formed on one of said gauging members in parallel relation to the contact strips on said anvil, one contact strip formed on the second gauging member at right angles to the contact strips on the first gauging member.

In testimony whereof I affix my signature.

ERIK H. ALDEBORGH.